(12) United States Patent
Leppanen et al.

(10) Patent No.: US 10,880,715 B2
(45) Date of Patent: Dec. 29, 2020

(54) APPARATUSES, METHODS AND COMPUTER PROGRAMS FOR PROVIDING VEHICLE FEEDBACK

(71) Applicant: Nokia Technologies Oy, Espoo (FI)

(72) Inventors: Jussi Leppanen, Tampere (FI); Arto Lehtiniemi, Lempaala (FI); Antti Eronen, Tampere (FI)

(73) Assignee: Nokia Technolgies Oy, Espoo (FI)

( * ) Notice: Subject to any disclaimer, the term of this patent is extended or adjusted under 35 U.S.C. 154(b) by 599 days.

(21) Appl. No.: 15/528,959

(22) PCT Filed: Nov. 12, 2015

(86) PCT No.: PCT/FI2015/050787
§ 371 (c)(1),
(2) Date: May 23, 2017

(87) PCT Pub. No.: WO2016/083662
PCT Pub. Date: Jun. 2, 2016

(65) Prior Publication Data
US 2017/0267254 A1    Sep. 21, 2017

(30) Foreign Application Priority Data

Nov. 25, 2014   (GB) .................... 1420931.6

(51) Int. Cl.
*H04W 4/80* (2018.01)
*H04W 4/48* (2018.01)
(Continued)

(52) U.S. Cl.
CPC ............ *H04W 4/80* (2018.02); *B60K 35/00* (2013.01); *B60W 50/16* (2013.01); *G06F 3/016* (2013.01);
(Continued)

(58) Field of Classification Search
CPC ......... H04W 4/48; H04W 4/38; H04W 4/046; B60K 35/00; B60W 50/16; G06F 3/016;
(Continued)

(56) References Cited

U.S. PATENT DOCUMENTS 8,552,847 B1    10/2013   Hill ............................. 340/407
8,974,349 B2 *  3/2015   Weast .................... A61B 5/681
                                                         482/8
(Continued)

FOREIGN PATENT DOCUMENTS

WO    WO-2013/187977 A1    12/2013

OTHER PUBLICATIONS

"Jardinico, Jade Bryan, Nokia C7 as remote control for BMW car, https://www.youtube.com/watch?v=-6TNtCvg3Z0&fs=1&hl=en%5FUS&hd=1, Published on Jan. 19, 2011" (Year: 2011).*
(Continued)

*Primary Examiner* — Nicholas Kiswanto
(74) *Attorney, Agent, or Firm* — Harrington & Smith

(57) ABSTRACT

A method including causing transmission of at least one signal to at least one apparatus, separate from an autonomous or semi-autonomous vehicle, to cause the at least one apparatus to provide feedback to at least one passenger of the autonomous or semi-autonomous vehicle to provide control information of the autonomous or semi-autonomous vehicle.

15 Claims, 9 Drawing Sheets

Figure 1:
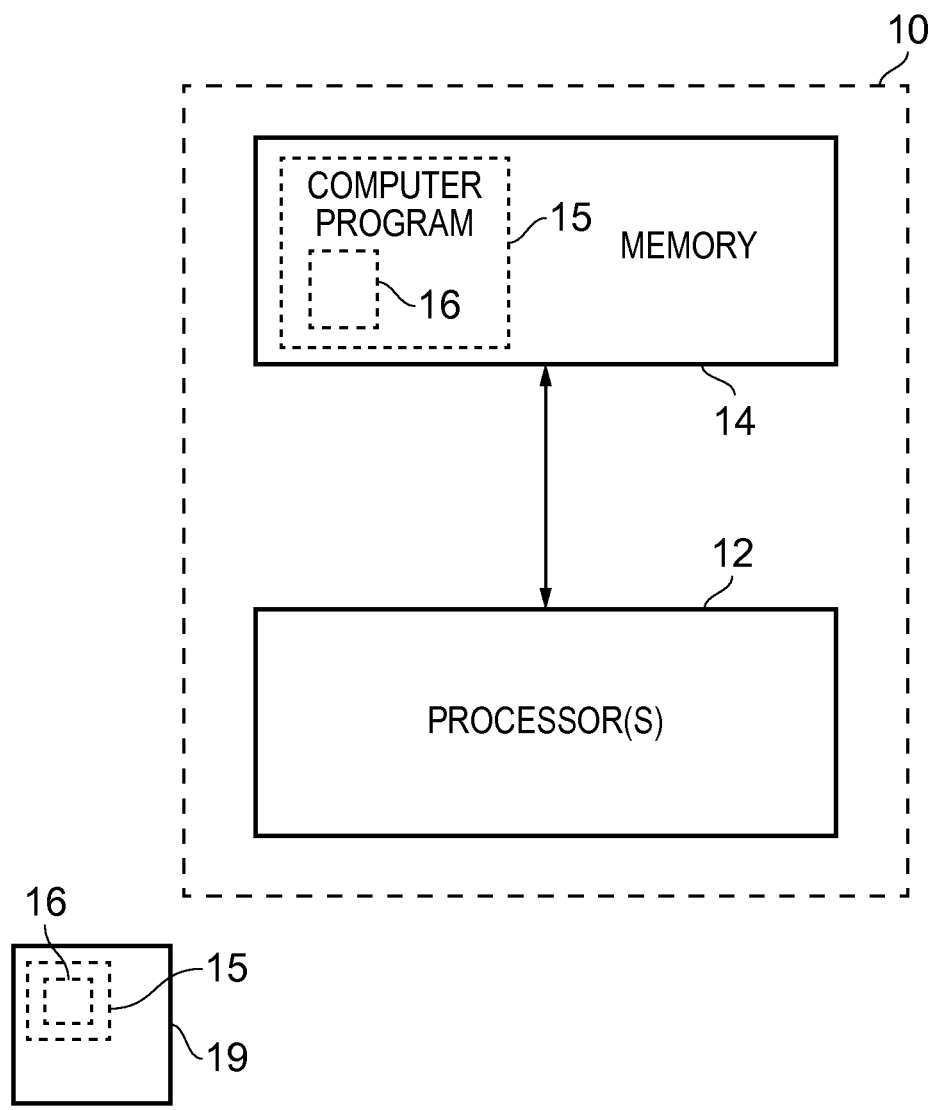

(51) Int. Cl.
  *G06F 3/01* (2006.01)
  *B60W 50/16* (2020.01)
  *B60K 35/00* (2006.01)
  *G06F 17/40* (2006.01)
  *G08G 1/16* (2006.01)
  *H04W 4/38* (2018.01)

(52) U.S. Cl.
  CPC .............. *G06F 3/017* (2013.01); *G06F 17/40* (2013.01); *G08G 1/162* (2013.01); *G08G 1/167* (2013.01); *H04W 4/48* (2018.02); *B60K 2370/158* (2019.05); *H04W 4/38* (2018.02)

(58) Field of Classification Search
  CPC ......... G06F 3/017; G06F 17/40; G08G 1/162; G08G 1/167; B06K 2370/158
  See application file for complete search history.

(56) References Cited

U.S. PATENT DOCUMENTS

| | | | | |
|---|---|---|---|---|
| 10,520,378 | B1* | 12/2019 | Brown | A61B 5/11 |
| 2006/0097857 | A1 | 5/2006 | Osaka et al. | 340/435 |
| 2007/0034107 | A1* | 2/2007 | Barbeau | G01C 21/20 |
| | | | | 104/307 |
| 2012/0078496 | A1 | 3/2012 | Lindhuber et al. | 701/123 |
| 2013/0144490 | A1* | 6/2013 | Lord | G08G 1/164 |
| | | | | 701/41 |
| 2013/0158846 | A1 | 6/2013 | Zhang | 701/117 |
| 2013/0231824 | A1 | 9/2013 | Wilson et al. | 701/26 |
| 2014/0240132 | A1* | 8/2014 | Bychkov | A61B 5/18 |
| | | | | 340/576 |
| 2015/0367176 | A1* | 12/2015 | Bejestan | B62J 99/00 |
| | | | | 482/9 |
| 2016/0170494 | A1* | 6/2016 | Bonnet | B60W 50/10 |
| | | | | 345/173 |
| 2018/0040258 | A1* | 2/2018 | Kouache | H04M 19/04 |

OTHER PUBLICATIONS

Koo, Jeamin, "Design Requirements for Car-To-Driver Interaction in the Context of Semi-Autonomous Driving", A Dissertation Submitted to the Department of Mechanical Engineering and the Committee on Graduate Studies of Stanford Univeristy, 2014, 96 pgs.

Sadigh, Dorsa, et al., "User Interface Design and Verification for Semi-Autonomous Driving", Proceedings of the $3^{rd}$ International Conference on High Confidence Networked Systems, 2014, pp. 63-64.

Koo, Jeamin, et al., "Why did my car just do that? Explaining semi-autonomous driving actions to improve driver understanding, trust, and performance", International Journal on Interactive design and Manufacturing, Apr. 30, 2014, 7 pgs.

* cited by examiner

APPARATUSES, METHODS AND COMPUTER PROGRAMS FOR PROVIDING VEHICLE FEEDBACK

TECHNOLOGICAL FIELD

Examples of the disclosure relate to providing vehicle feedback. Some examples relate to providing vehicle feedback in autonomous and/or semi-autonomous vehicles.

BACKGROUND

Autonomous and semi-autonomous vehicles are configured for unmanned operation. That is, autonomous and semi-autonomous vehicles are configured to move from one location to another, without a human driver positioned in the vehicle. One or more humans may be positioned in the vehicle, as passengers, but may not be providing driving input, such as controlling steering, braking, acceleration and so on.

An autonomous vehicle is a vehicle that is configured to navigate, steer, accelerate and decelerate autonomously (without any human driver being positioned in or outside the vehicle that is operating the vehicle).

A semi-autonomous vehicle is a vehicle that is configured to navigate, steer, accelerate and/or decelerate, without any human driver being present in the vehicle that is operating the vehicle, in response to instructions received from a remote location (for example, wirelessly). An autonomous vehicle might be operated semi-autonomously, for instance, if it no longer becomes possible for the vehicle to operate autonomously for some reason.

A semi-autonomous vehicle may also be a vehicle that is driven a human in the vehicle but may take control itself for the purpose of safety or convenience. For example, the vehicle may control itself to automatically park and so on.

BRIEF SUMMARY

According to various, but not necessarily all, examples of the disclosure there is provided a method comprising: causing transmission of at least one signal to at least one apparatus, separate from an autonomous or semi-autonomous vehicle, to cause the at least one apparatus to provide feedback to at least one passenger of the autonomous or semi-autonomous vehicle to provide control information of the autonomous or semi-autonomous vehicle.

According to various, but not necessarily all, examples of the disclosure there is provided an apparatus comprising at least one processor; and at least one memory including computer program code;

the at least one memory and the computer program code configured to, with the at least one processor, cause the apparatus at least to perform:

causing transmission of at least one signal to at least one further apparatus, separate from an autonomous vehicle or semi-autonomous vehicle, to cause the at least one further apparatus to provide feedback to at least one passenger of the autonomous or semi-autonomous vehicle to provide control information of the autonomous or semi-autonomous vehicle.

According to various, but not necessarily all, examples of the disclosure there is provided computer program code that, when performed by at least one processor, causes at least the following to be performed: causing transmission of at least one signal to at least one apparatus, separate from an autonomous vehicle or semi-autonomous vehicle, to cause the at least one apparatus to provide feedback to at least one passenger of the autonomous or semi-autonomous vehicle to provide control information of the autonomous or semi-autonomous vehicle.

The computer program code may be stored on a non-transitory computer readable medium.

According to various, but not necessarily all, examples of the disclosure there is provided an apparatus comprising means for causing transmission of at least one signal to at least one apparatus, separate from an autonomous or semi-autonomous vehicle, to cause the at least one apparatus to provide feedback to at least one passenger of the autonomous or semi-autonomous vehicle to provide control information of the autonomous or semi-autonomous vehicle.

According to various, but not necessarily all, examples of the disclosure there is provided a method comprising: causing reception of at least one signal from an autonomous or semi-autonomous vehicle; and in response to receiving the at least one signal causing at least one apparatus, separate from the autonomous or semi-autonomous vehicle, to provide feedback to a passenger of the autonomous or semi-autonomous vehicle to provide control information of the autonomous or semi-autonomous vehicle.

According to various, but not necessarily all, examples of the disclosure there is provided an apparatus comprising at least one processor; and at least one memory including computer program code;

the at least one memory and the computer program code configured to, with the at least one processor, cause the apparatus at least to perform: causing reception of at least one signal from an autonomous or semi-autonomous vehicle; and in response to receiving the at least one signal causing at least one apparatus, separate from the autonomous or semi-autonomous vehicle, to provide feedback to a passenger of the autonomous or semi-autonomous vehicle to provide control information of the autonomous or semi-autonomous vehicle.

According to various, but not necessarily all, examples of the disclosure there is provided computer program code that, when performed by at least one processor, causes at least the following to be performed: causing reception of at least one signal from an autonomous or semi-autonomous vehicle; and in response to receiving the at least one signal causing at least one apparatus, separate from the autonomous or semi-autonomous vehicle, to provide feedback to a passenger of the autonomous or semi-autonomous vehicle to provide control information of the autonomous or semi-autonomous vehicle.

The computer program code may be stored on a non-transitory computer readable medium.

According to various, but not necessarily all, examples of the disclosure there is provided an apparatus comprising means for causing reception of at least one signal from an autonomous or semi-autonomous vehicle; and means for, in response to receiving the at least one signal, causing at least one apparatus, separate from the autonomous or semi-autonomous vehicle, to provide feedback to a passenger of the autonomous or semi-autonomous vehicle to provide control information of the autonomous or semi-autonomous vehicle.

According to various, but not necessarily all, examples of the disclosure there is provided a system comprising: apparatus comprising at least one processor; and at least one memory including computer program code;

the at least one memory and the computer program code configured to, with the at least one processor, cause the apparatus at least to perform:

causing transmission of at least one signal to at least one further apparatus, separate from an autonomous vehicle or semi-autonomous vehicle, to cause the at least one further apparatus to provide feedback to at least one passenger of the autonomous or semi-autonomous vehicle to provide control information of the autonomous or semi-autonomous vehicle; and an apparatus comprising at least one processor; and at least one memory including computer program code;

the at least one memory and the computer program code configured to, with the at least one processor, cause the apparatus at least to perform: causing reception of at least one signal from an autonomous or semi-autonomous vehicle; and in response to receiving the at least one signal causing at least one apparatus, separate from the autonomous or semi-autonomous vehicle, to provide feedback to a passenger of the autonomous or semi-autonomous vehicle to provide control information of the autonomous or semi-autonomous vehicle.

BRIEF DESCRIPTION

Figure 2:
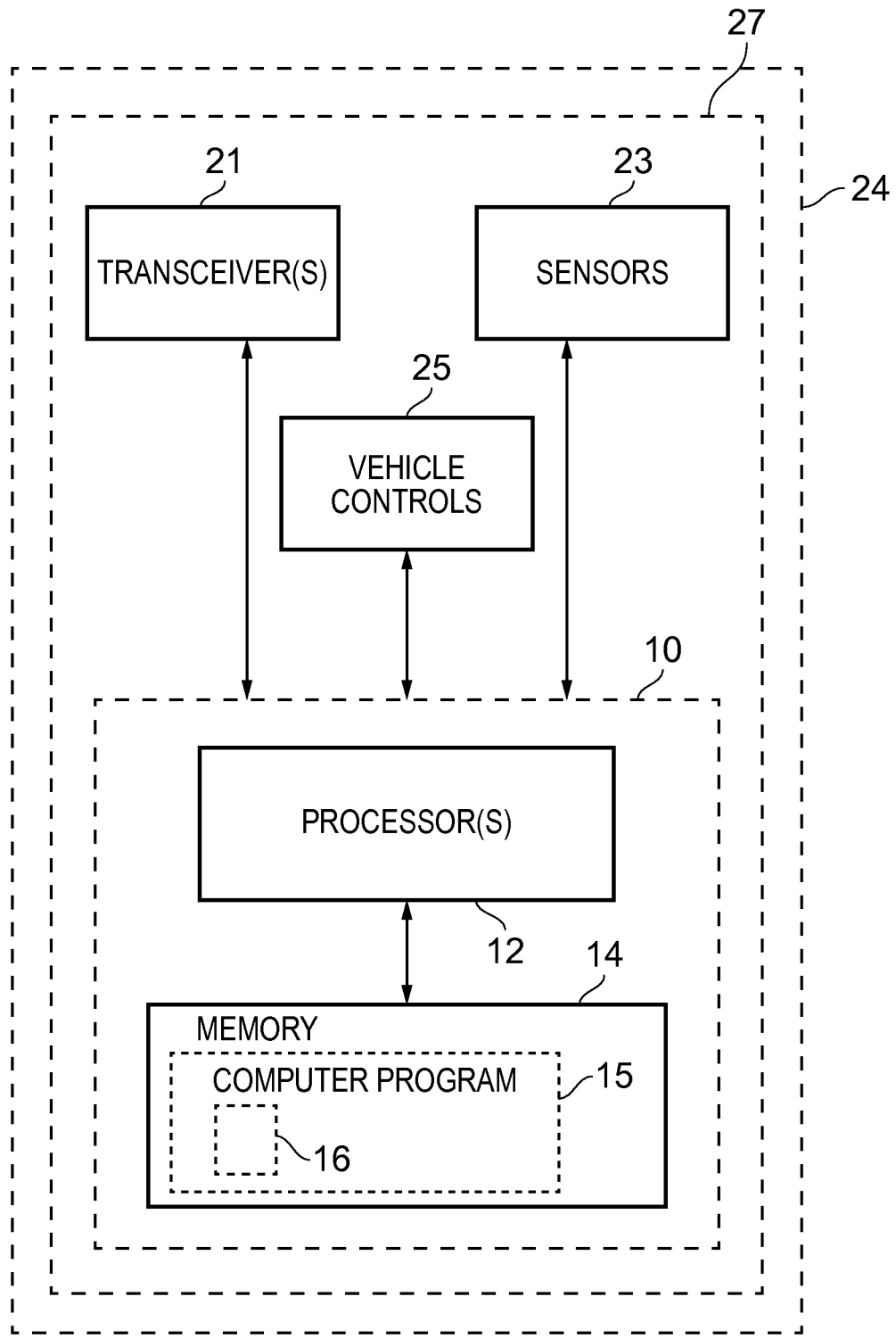
Figure 3A:
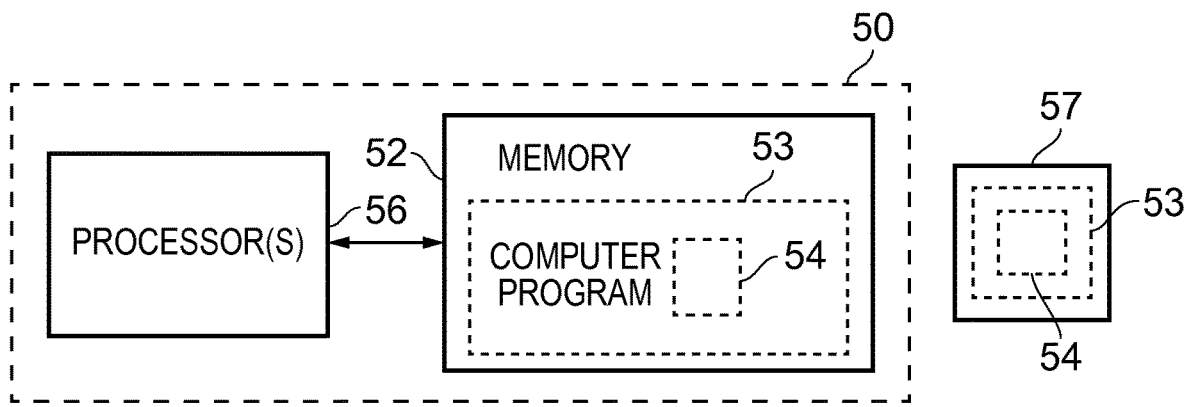
Figure 3B:
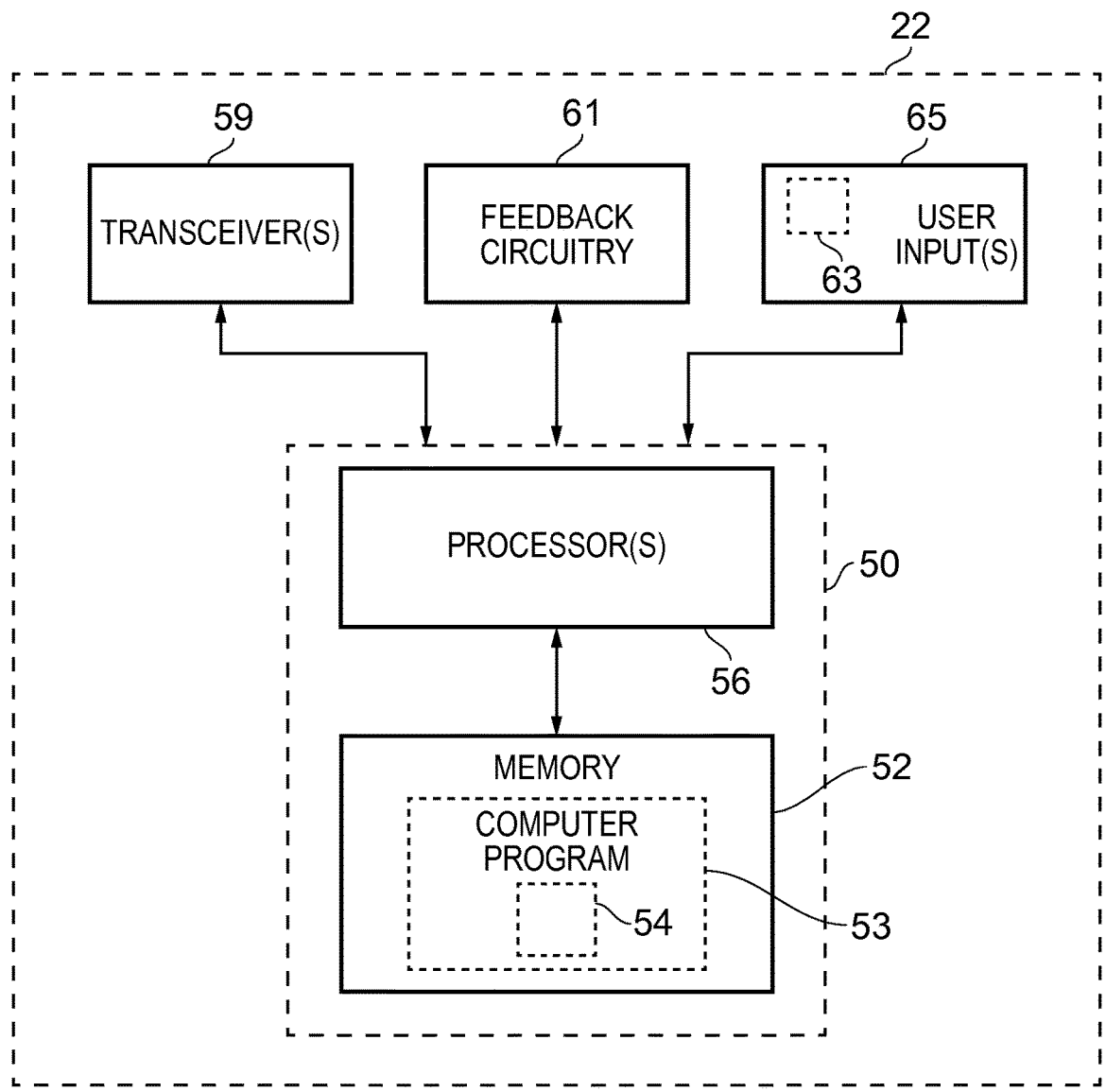
Figure 4:
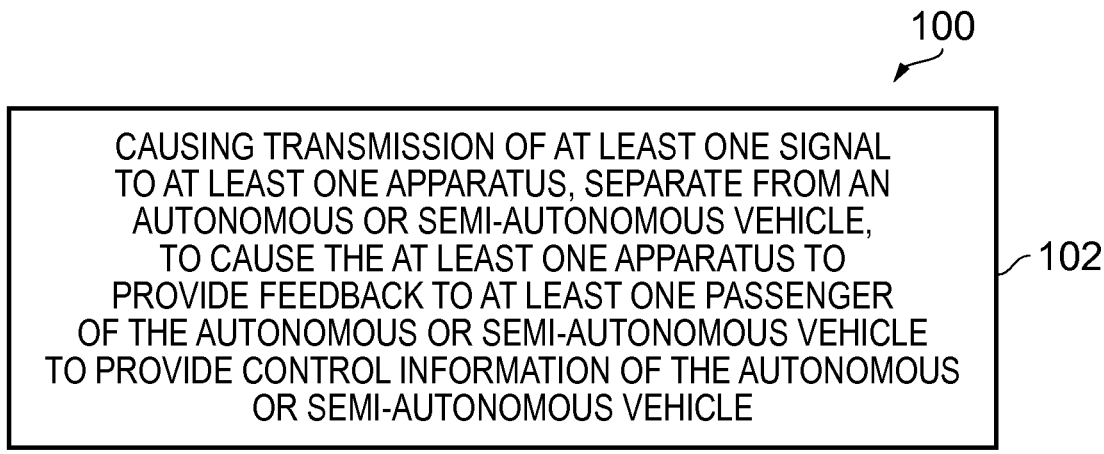
Figure 5:
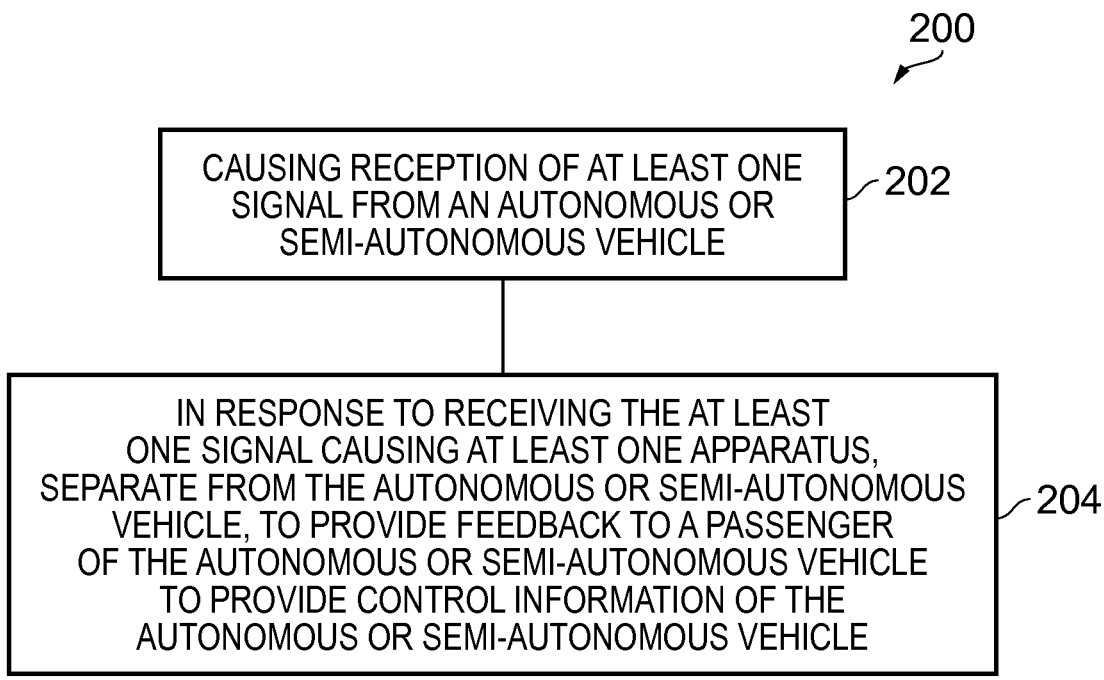
Figure 6:
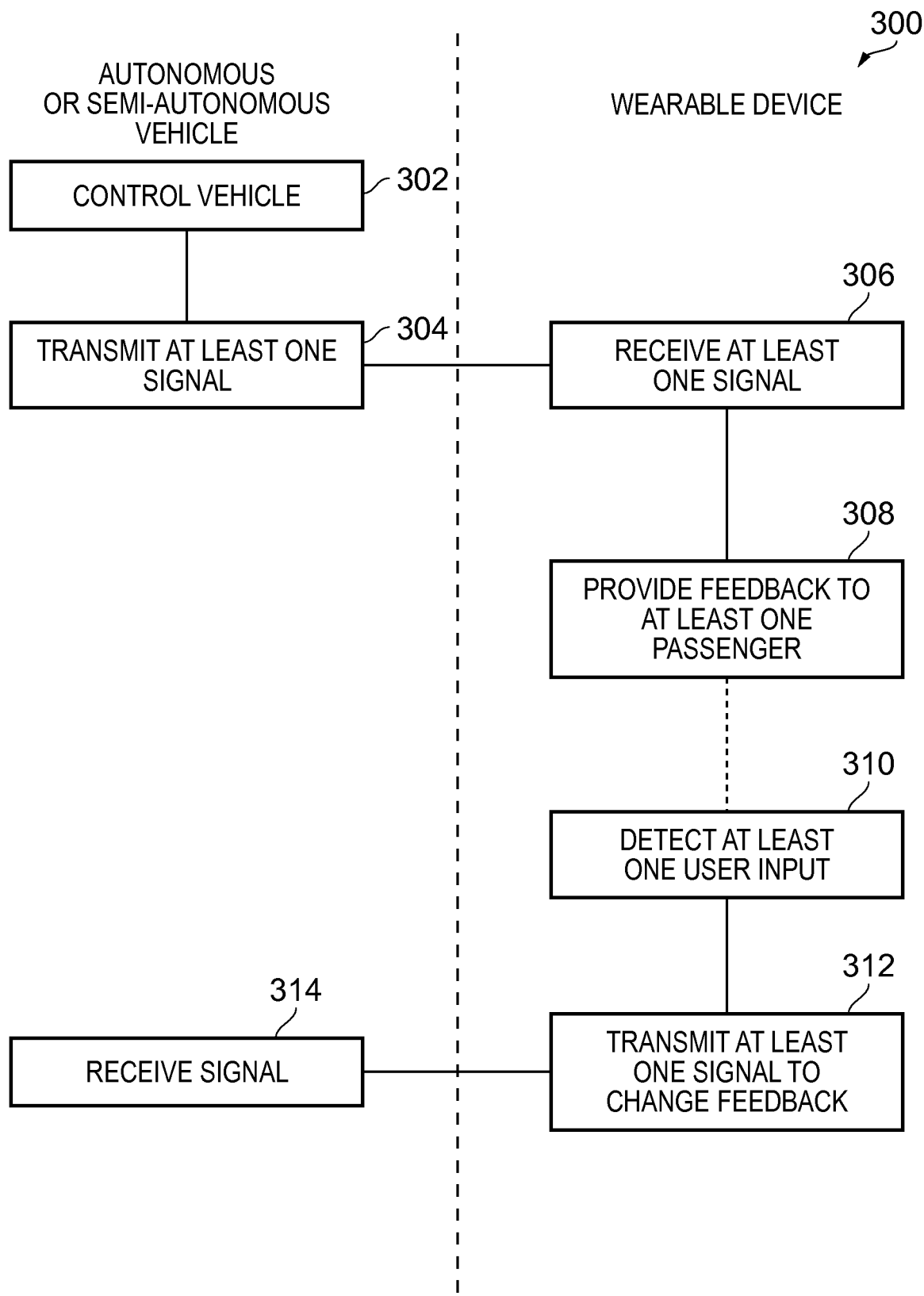
Figure 7:
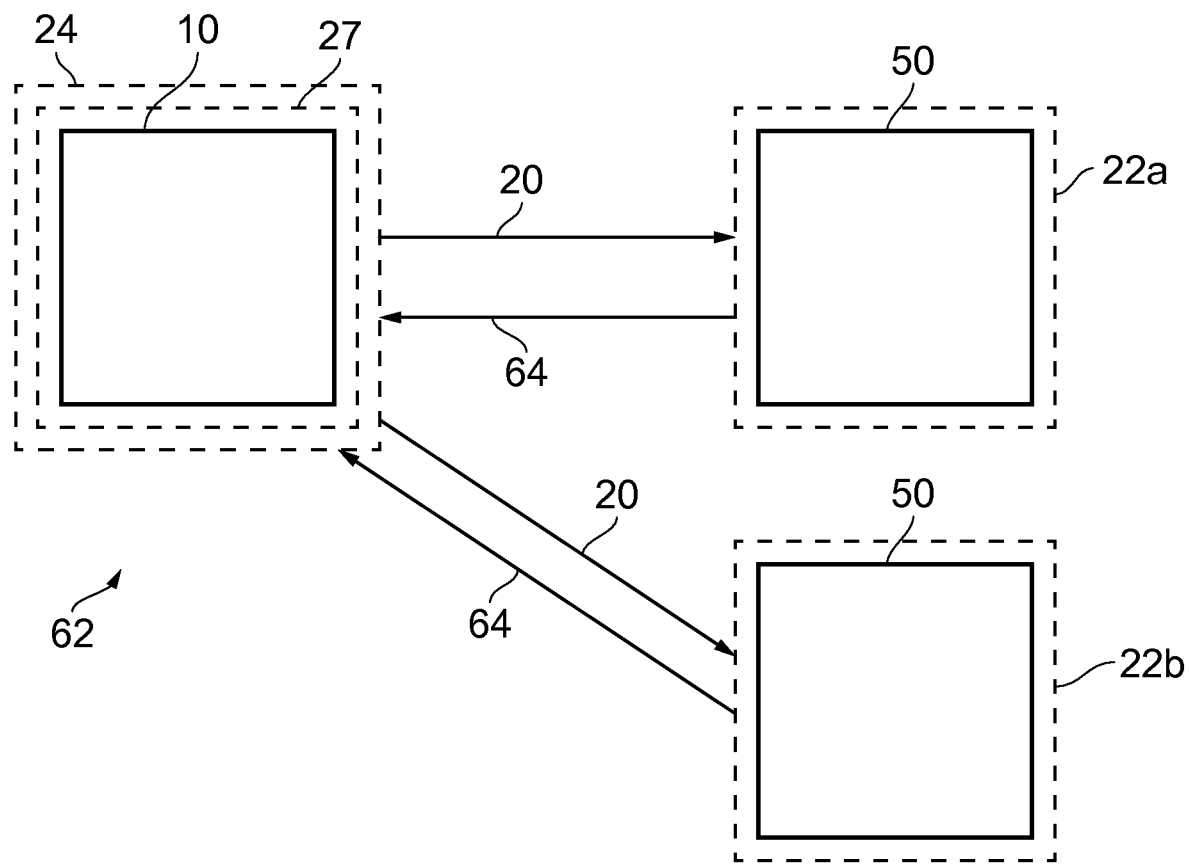
Figure 8:
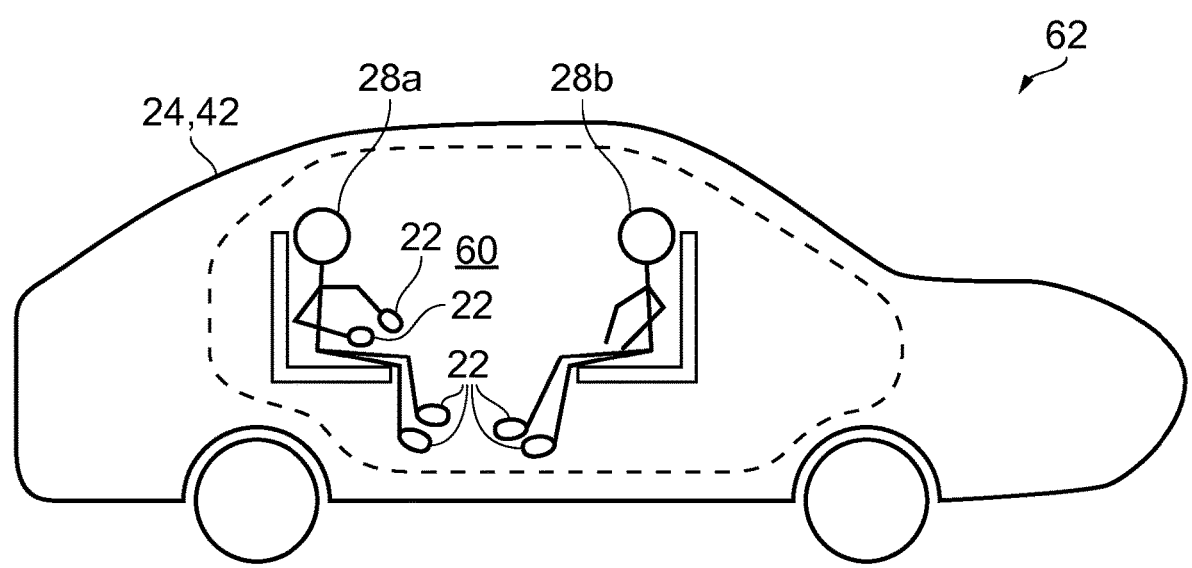
Figure 9:
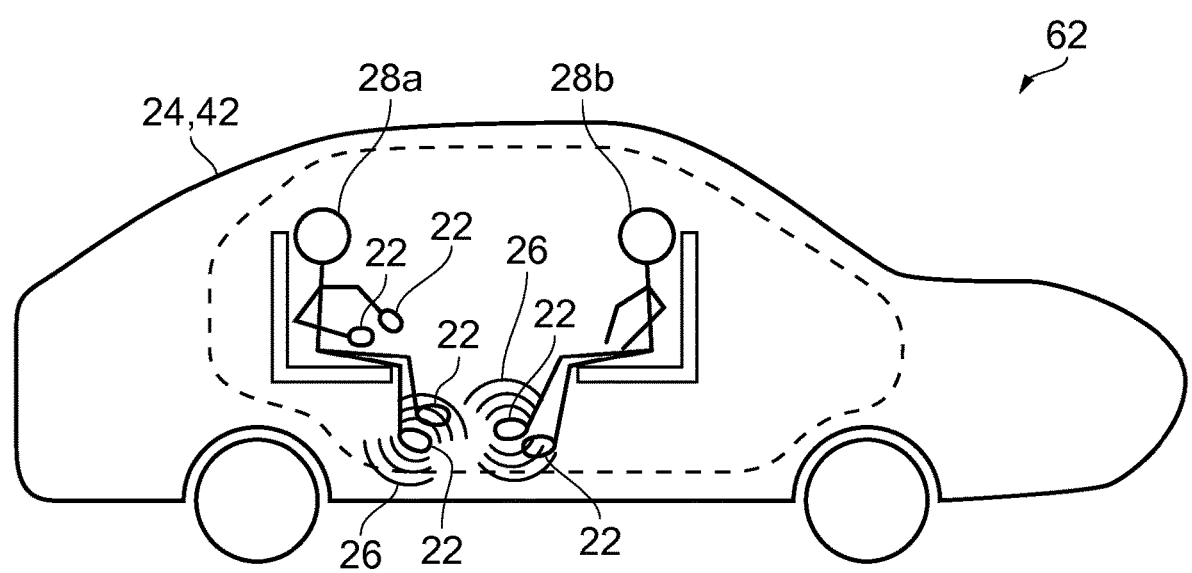
Figure 10:
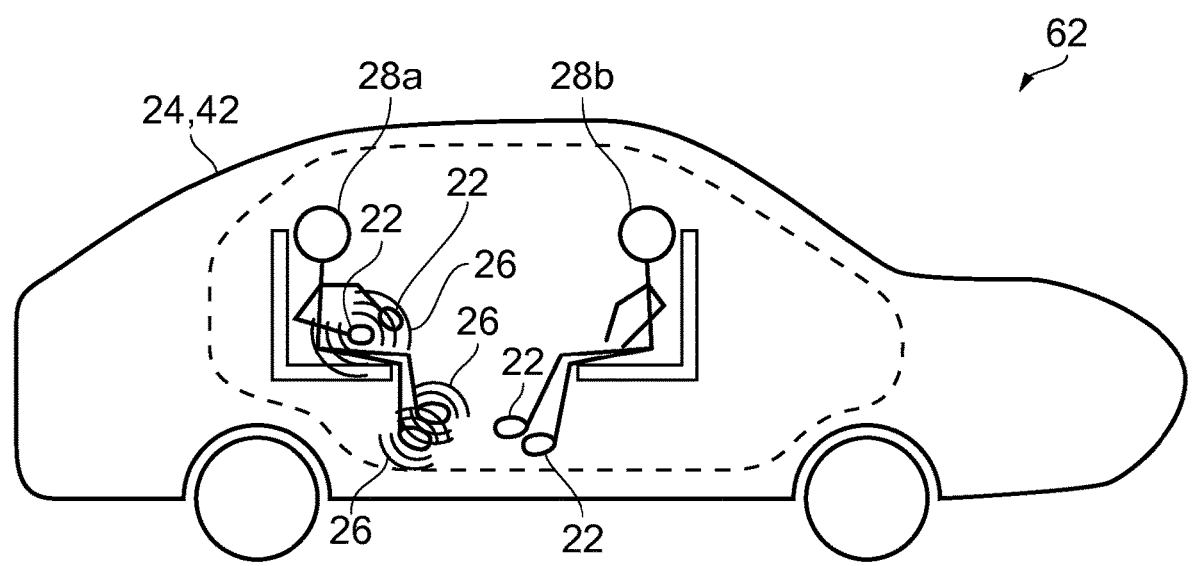

For a better understanding of various examples that are useful for understanding the brief description, reference will now be made by way of example only to the accompanying drawings in which:

FIG. 1 illustrates an example of an apparatus;
FIG. 2 illustrates an example of an apparatus;
FIG. 3A illustrates an example of an apparatus;
FIG. 3B illustrates an example of an apparatus;
FIG. 4 illustrates an example of a method;
FIG. 5 illustrates an example of a method;
FIG. 6 illustrates an example of a method;
FIG. 7 illustrates an example of a system;
FIG. 8 illustrates an example of a system;
FIG. 9 illustrates an example of a system; and
FIG. 10 illustrates an example of a system.

DETAILED DESCRIPTION

Examples of the disclosure relate to providing feedback to at least one passenger of an autonomous or semi-autonomous vehicle to provide control information of the autonomous or semi-autonomous vehicle.

As used herein control information is intended to include information that may inform a passenger of the autonomous or semi-autonomous vehicle of a control activity or control activities that have been, are being and/or will be performed by the autonomous or semi-autonomous vehicle. In some examples the control information may be pedal related control information that relates to a control activity or activities involving one or more pedals in a conventionally controlled vehicle and/or steering related control information that relates to a control activity or activities involved in steering a conventionally controlled vehicle and/or gear related control information which relates to a control activity or activities involved in gear changes in a conventionally controlled car. For example, control information may inform a passenger of the autonomous or semi-autonomous vehicle that the vehicle is changing speed and/or direction and/or is changing gear.

In some examples, the control information may relate to one or more primary control activities that allow the autonomous or semi-autonomous vehicle to traverse from one location to another location such as changing speed and/or changing direction and/or changing gear and so on.

Additionally or alternatively, in some examples the control information may relate to one or more secondary control activities that relate to customizing the passenger environment of the autonomous or semi-autonomous vehicle and/or do not relate to control activities that allow the autonomous or semi-autonomous vehicle to traverse from one location to another location. For example, secondary control activities may comprise adjusting the temperature, controlling a radio/music player, controlling heated seats, controlling one or more lights controlling one or more windows and so on.

The feedback may simulate a driving activity of the autonomous or semi-autonomous vehicle. As used herein driving activity is intended to include activities that may be performed by a driver of a vehicle such as one or more primary or secondary control activities. For example accelerating, braking, changing gear, steering, indicating, adjusting temperature and so on.

A technical effect of at least some examples of the disclosure is that a passenger of the autonomous or semi-autonomous vehicle is aware of what is occurring in the autonomous or semi-autonomous vehicle and may feel less detached from the driving action of the autonomous or semi-autonomous vehicle.

Another technical effect of at least some examples of the disclosure is that they provide for safer operation of an autonomous or semi-autonomous vehicle.

FIGS. 1, 2 and 7 to 10 illustrate an apparatus 10 comprising means for causing transmission of at least one signal 20 to at least one apparatus 22, separate from an autonomous or semi-autonomous vehicle 24, to cause the at least one apparatus 22 to provide feedback 26 to at least one passenger 28 of the autonomous or semi-autonomous vehicle 24 to provide control information of the autonomous or semi-autonomous vehicle 24.

FIGS. 3A, 3B and 7 to 10 illustrate an apparatus 50 comprising means for causing reception of at least one signal 20 from an autonomous or semi-autonomous vehicle 24 and means for, in response to receiving the at least one signal 20, causing at least one apparatus 22, separate from the autonomous or semi-autonomous vehicle 24, to provide feedback 26 to a passenger 28 of the autonomous or semi-autonomous vehicle 24 to provide control information of the autonomous or semi-autonomous vehicle 24.

FIG. 4 illustrates a method 100 comprising causing transmission of at least one signal 20 to at least one apparatus 22, separate from an autonomous or semi-autonomous vehicle 24, to cause the at least one apparatus 22 to provide feedback 26 to at least one passenger 28 of the autonomous or semi-autonomous vehicle 24 to provide control information of the autonomous or semi-autonomous vehicle 24.

FIG. 5 illustrates a method 200 comprising causing reception of at least one signal 20 from an autonomous or semi-autonomous vehicle 24 and in response to receiving the at least one signal 20 causing at least one apparatus 22, separate from the autonomous or semi-autonomous vehicle 24, to provide feedback 26 to a passenger 28 of the autonomous or semi-autonomous vehicle 24 to provide control information of the autonomous or semi-autonomous vehicle 24.

For the sake of clarity and brevity in the description below the term "autonomous vehicle" will be used and is intended to refer to an autonomous and/or semi-autonomous vehicle.

FIG. 1 illustrates an example of an apparatus 10 that may be a chip or a chip set. The apparatus 10 may form part of an apparatus 27 comprised in an autonomous vehicle 24 such as the one illustrated in the example of FIG. 2. The apparatus 27 may be a vehicle control system.

Implementation of the apparatus 10 may be as controller circuitry. The controller may be implemented in hardware alone, have certain aspects in software including firmware alone or can be a combination of hardware and software (including firmware).

As illustrated in FIG. 1 the controller may be implemented using instructions that enable hardware functionality, for example, by using executable computer program instructions 15 in a general-purpose or special-purpose processor 12 that may be stored on a computer readable storage medium (disk, memory etc) to be executed by such a processor 12.

The processor 12 is configured to read from and write to the memory 14. The processor 12 may also comprise an output interface via which data and/or commands are output by the processor 12 and an input interface via which data and/or commands are input to the processor 12.

The memory 14 stores a computer program 15 comprising computer program instructions (computer program code) that controls the operation of the apparatus 10 when loaded into the processor 12. The computer program instructions, of the computer program 15, provide the logic and routines that enables the apparatus to perform the methods illustrated in FIGS. 4, 5 and/or at least part of the method illustrated in FIG. 6. The processor 12 by reading the memory 14 is able to load and execute the computer program 15.

The apparatus 10 therefore comprises:
at least one processor 12; and
at least one memory 14 including computer program code 15
the at least one memory 14 and the computer program code 15 configured to, with the at least one processor 12, cause the apparatus 10 at least to perform: causing transmission of at least one signal to at least one apparatus, separate from an autonomous or semi-autonomous vehicle, to cause the at least one apparatus to provide feedback to at least one passenger of the autonomous or semi-autonomous vehicle to provide control information of the autonomous or semi-autonomous vehicle.

As illustrated in FIG. 1, the computer program 15 may arrive at the apparatus 10 via any suitable delivery mechanism 19. The delivery mechanism 19 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 15. The delivery mechanism may be a signal configured to reliably transfer the computer program 15. The apparatus 10 may propagate or transmit the computer program 15 as a computer data signal.

Although the memory 14 is illustrated as a single component/circuitry it may be implemented as one or more separate components/circuitry some or all of which may be integrated/removable and/or may provide permanent/semi-permanent/dynamic/cached storage.

Although the processor 12 is illustrated as a single component/circuitry it may be implemented as one or more separate components/circuitry some or all of which may be integrated/removable. The processor 12 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the FIGS. 4 and 6 may represent actions in a method and/or sections of code in the computer program 15. The illustration of a particular order to the blocks does not necessarily imply that there is a required or preferred order for the blocks and the order and arrangement of the block may be varied. Furthermore, it may be possible for some blocks to be omitted.

FIG. 2 illustrates an example of an apparatus 27. In some examples the apparatus 27 may be a vehicle control system for an autonomous vehicle 24. The apparatus 27 may be comprised in an autonomous vehicle 24.

In the example of FIG. 2, the apparatus 27 comprises one or more transceivers 21, one or more sensors 23, one or more vehicle controls 25 and the apparatus 10 illustrated in FIG. 1.

The processor 12 provides means for controlling operation of the apparatus 27.

As illustrated in the example of FIG. 2, the elements 21, 25 and 23 are operationally coupled to the apparatus 10 and any number of a combination of intervening elements can exist between them (including no intervening elements).

In other examples, the elements 21, 25 and 23 may be operationally coupled to each other and/or may share one or more components.

The transceivers 21 may comprise one or more radio transceivers 21. The one or more radio frequency transceivers 21 are configured to transmit and receive radio frequency signals. For example, the one or more radio frequency transceivers 21 may be compatible with one or more short range radio protocols, such as Bluetooth or Wi-Fi protocols. Alternatively or additionally, the one or more radio frequency transceivers may be compatible with one or more longer range radio protocols, such as one or more cellular telephone protocols.

The processor 12 is configured to control the one or more radio frequency transceivers 21 to transmit radio frequency signals comprising data. The processor 12 is also configured to receive inputs from the one or more radio frequency transceivers 21 in the form of data comprised in received radio frequency signals.

For example, the one or more radio frequency transceivers 21 may be configured to transmit at least one signal 20 to at least one apparatus 22 (see, for example, FIGS. 7 to 10), separate from the autonomous vehicle 24, to cause the at least one apparatus 22 to provide feedback 26 to at least one passenger 28 of the autonomous vehicle 24 to provide control information of the autonomous vehicle 24.

The apparatus 10 may therefore, in some examples, be considered to control the feedback 26 provided to a passenger 28 of the autonomous vehicle 24.

In some examples the apparatus 10 may control one or more wearable devices to provide feedback 26 to at least one passenger 28 of the autonomous vehicle 24.

The one or more transceivers 21 provide means for transmitting and/or receiving signals comprising data.

The one or more sensors 23 may be configured to obtain information. For example, the one or more sensors 23 may be configured to obtain information to allow the autonomous vehicle 24 to operate without a human driver within the vehicle controlling the driving functions of the autonomous vehicle 24. For example, one or more passengers may be within the autonomous vehicle 24 but the autonomous vehicle 24 may control itself or be controlled without input from the passengers within the autonomous vehicle 24.

The one or more sensors 23 may be configured to obtain information to allow the autonomous vehicle 24 to perform safety critical driving functions and/or monitor roadway conditions.

Additionally or alternatively, the one or more sensors 23 may be configured to obtain information of the one or more passengers 28 of the autonomous vehicle 24. For example, the one or more sensors 23 may be configured to obtain information in relation to the status, such as the emotional state, of a passenger or passengers 28.

Additionally or alternatively the one or more sensors 23 may be configured to detect a gesture from the passenger 28 such as a movement of the passenger's body.

For example, the one or more sensors 23 may be configured to detect the motion of one or more parts of a passenger's body such as a hand of a passenger 28.

The one or more sensors 23 may comprise any suitable sensors. For example, the one or more sensors 23 may comprise one or more cameras and/or one or more microwave sensors and/or one or more infrared sensors and/or one or more LIDAR sensors. The one or more sensors 23 provide means for transmitting and/or receiving signals comprising data.

The processor 12 is configured to control operation of the one or more sensors 23. For example, the processor 12 may be configured to control the one or more sensors 23 to transmit and/or receive signals comprising data.

The processor 12 is also configured to process received signals from the one or more transceivers 21 and/or the one or more sensors 23 to allow the autonomous vehicle 24 to determine its environment and/or to detect the status and/or to detect one or more gestures from the passenger 28 or passengers 28 of the autonomous vehicle 24.

The one or more vehicle controls 25 are configured to control one or more driving functions of the autonomous vehicle 24. For example, the one or more vehicle controls 25 may be configured to control steering, acceleration, braking and/or gear changes and so on of the autonomous vehicle 24.

In the example of FIG. 2 the processor 12 is configured to control operation of the one or more vehicle controls 25. In some examples, the processor 12 may be configured to control operation of the one or more vehicle controls 25 in response to information received from the one or more sensors 23 and/or one or more radio frequency transceivers 21.

In some examples, the apparatus 27 may comprise any number of additional elements. In some examples, the apparatus 27 may not comprise one or more elements illustrated in the example of FIG. 2. For example, the apparatus 27 may, in some examples, not comprise the one or more vehicle controls 25 and/or the one or more sensors 23.

In some examples, the apparatus 10 may be configured to communicate with a further apparatus configured to control the one or more vehicle controls 25 and/or the one or more sensors 23.

In some examples the autonomous vehicle 24 may be a ground-based vehicle. As used herein the term ground-based is intended to include vehicles that primarily operate on the surface of the earth, such as boats and so on that operate on water and cars and so on that operate on land.

FIG. 3A illustrates an example of an apparatus 50 that may be a chip or a chip set. The apparatus 50 may form part of an apparatus 22, for example a wearable device, such as the one illustrated in the example of FIG. 3B.

Implementation of the apparatus 50 may be as controller circuitry. The controller may be implemented in hardware alone, have certain aspects in software including firmware alone or can be a combination of hardware and software (including firmware).

As illustrated in FIG. 3A the controller may be implemented using instructions that enable hardware functionality, for example, by using executable computer program instructions 53 in a general-purpose or special-purpose processor 56 that may be stored on a computer readable storage medium (disk, memory etc) to be executed by such a processor 56.

The processor 56 is configured to read from and write to the memory 52. The processor 56 may also comprise an output interface via which data and/or commands are output by the processor 56 and an input interface via which data and/or commands are input to the processor 56.

The memory 52 stores a computer program 53 comprising computer program instructions (computer program code) that controls the operation of the apparatus 50 when loaded into the processor 56. The computer program instructions, of the computer program 53, provide the logic and routines that enables the apparatus to perform, for example, the methods illustrated in FIGS. 4, 5 and/or at least part of the method illustrated in FIG. 6. The processor 56 by reading the memory 52 is able to load and execute the computer program 53.

The apparatus 50 therefore comprises:
at least one processor 56; and
at least one memory 52 including computer program code 53
the at least one memory 52 and the computer program code 53 configured to, with the at least one processor 56, cause the apparatus 50 at least to perform:

causing reception of at least one signal from an autonomous or semi-autonomous vehicle; and in response to receiving the at least one signal causing at least one apparatus, separate from the autonomous or semi-autonomous vehicle, to provide feedback to a passenger of the autonomous or semi-autonomous vehicle to provide control information of the autonomous or semi-autonomous vehicle.

As illustrated in FIG. 3A, the computer program 53 may arrive at the apparatus 50 via any suitable delivery mechanism 57. The delivery mechanism 57 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 53. The delivery mechanism may be a signal configured to reliably transfer the computer program 53. The apparatus 50 may propagate or transmit the computer program 53 as a computer data signal.

Although the memory 52 is illustrated as a single component/circuitry it may be implemented as one or more separate components/circuitry some or all of which may be integrated/removable and/or may provide permanent/semi-permanent/dynamic/cached storage.

Although the processor 56 is illustrated as a single component/circuitry it may be implemented as one or more separate components/circuitry some or all of which may be integrated/removable. The processor 56 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The blocks illustrated in the FIGS. 5 and 6 may represent actions in a method and/or sections of code in the computer program 53. The illustration of a particular order to the blocks does not necessarily imply that there is a required or preferred order for the blocks and the order and arrangement of the block may be varied. Furthermore, it may be possible for some blocks to be omitted.

The memory 52 may store control parameters for controlling the feedback provided.

FIG. 3B illustrates an example of an apparatus 22. In the illustrated example the apparatus 22 is a wearable device such as an item of smart clothing, for example a glove or a shoe.

In the example of FIG. 3B the apparatus 22 comprises one or more transceivers 59, feedback circuitry 61 and the apparatus 50 illustrated in FIG. 3A.

In some examples, the apparatus 22 may comprise one or more user inputs 65.

As illustrated in the example of FIG. 3B the elements 59, 61 and 65 are operationally coupled to the apparatus 50 and any number or combination of intervening elements can exist between them (including no intervening elements).

In other examples, the elements 59, 61 and 65 may be operationally coupled to each other and/or may share one or more components.

The transceivers 59 may comprise one or more radio transceivers 59. The one or more radio frequency transceivers 59 are configured to transmit and receive radio frequency signals. For example, the one or more radio frequency transceivers 59 may be compatible with one or more short range radio protocols, such as Bluetooth or Wi-Fi protocols. Alternatively or additionally, the one or more radio frequency transceivers 59 may be compatible with one or more longer range radio protocols, such as one or more cellular telephone protocols.

For example, the one or more transceivers 59 may be configured to receive at least one signal from an autonomous vehicle 24.

The one or more transceivers provide means for transmitting and/or receiving signals comprising data.

The processor 56 is configured to control the one or more radio frequency transceivers 59 to transmit radio frequency signals comprising data. The processor 56 is also configured to receive inputs from the one or more radio frequency transceivers 59 in the form of data comprised in received radio frequency signals.

The feedback circuitry 61 may comprise any suitable component or components to provide feedback 26 to a user/wearer of the apparatus 22 such as a passenger 28 of an autonomous vehicle 24.

For example, the user feedback circuitry 61 may be configured to provide aural, visual and/or tactile/haptic feedback to the wearer. In this regard, the feedback circuitry 61 may comprise one or more loud speakers, one or more displays, one or more vibrating elements and/or one or more actuators.

In examples, the feedback circuitry 61 is configured to provide feedback to at least one passenger 28 (see, for example, FIGS. 7 to 10) of the autonomous vehicle 24 to provide control information of the autonomous vehicle 24.

In some examples the feedback may therefore comprise non-visual feedback and/or tactile feedback.

The feedback circuitry 61 may be configured to provide feedback 26 to provide control information of at least one driving activity of the autonomous vehicle 24 to a passenger 28 of the autonomous vehicle 24.

The feedback circuitry 61 may be configured to provide any suitable feedback 26 to the wearer such as a passenger 28 of an autonomous vehicle 24 to inform the wearer of the current driving activities of the autonomous vehicle 24.

For example, the feedback circuitry 61 may be configured to provide feedback 26 to the wearer to inform the wearer that the autonomous vehicle is changing direction and/or changing speed and/or changing gear.

The feedback circuitry 61 may be configured to provide feedback 26 to simulate the at least one driving activity of the autonomous vehicle 24. In some examples, the feedback circuitry 61 may be configured to provide feedback 26 to simulate a response 34 experienced by a driver of a vehicle 38 when actuating a controller of a vehicle.

For example, the feedback circuitry 61 may be configured to simulate a sensation, such as pressure, felt on a part of the body of a driver when the driver actuates the control of a vehicle 38 such as when braking, accelerating, changing gear, steering and/or indicating and so on.

In some examples, the feedback circuitry 61 may be configured to provide more than one type of feedback at a time. For example, the feedback circuitry 61 may be configured to simultaneously provide tactile and visual feedback or aural and tactile feedback and so on.

The processor 56 is configured to control the user feedback circuitry 61 to provide feedback to a wearer/user of the apparatus 22 which may be a wearable device.

The feedback circuitry 61 provides means for providing feedback 26.

In some examples, the apparatus 22 may comprise one or more user inputs 65 configured to receive one or more inputs from the wearer/user of the apparatus 22.

The user input 65 may comprise any suitable component or components to receive user input. For example, the user input 65 may comprise one or more keys and/or one or more touch sensitive devices to allow a user to provide input.

In some examples, the user input 65 comprises one or more motion sensors 63. The one or more motion sensors 63 are configured to sense motion of the apparatus 22 and provide inputs to the processor 56 that are representative of that motion. The one or more motion sensors 63 may comprise one or more accelerometers and/or one or more gyroscopes, for example.

A user may provide user input, in the form of a gesture, such as a motion gesture, by performing a gesture in which the apparatus 22 is moved through the air. The one or more motion sensors 63 sense the motion of the apparatus 22 and provide input to the processor 56 that are representative of that motion. The processor 56 is configured to identify particular gestures/user inputs made by the user from the inputs provided to it by the motion sensor(s) 63.

In examples, a user may control the feedback provided by the feedback circuitry 61 using the user input 65.

The one or more user inputs 65 provide means for providing input.

In some examples, the apparatus 22 does not comprise the one or more user inputs 65.

In some examples, the apparatus 22 may comprise any number of additional elements.

The processor 56 provides means for controlling operation of the apparatus 22.

FIG. 4 illustrates an example of a method 100. The method 100 may be performed by the apparatus 10 of FIG. 1 and/or the apparatus 27 of FIG. 2.

At block 102 transmission of at least one signal 20 to at least one apparatus 22, separate from an autonomous vehicle 24, to cause the at least one apparatus 22 to provide feedback 26 to at least one passenger 28 of the autonomous vehicle 24 to provide control information of the autonomous vehicle 24 is caused (see, for example, FIGS. 7 to 10).

In some examples the method may comprise transmitting the at least one signal 20. For example, the apparatus 10 may control the one or more transceivers 21 to transmit the at least one signal 20.

In some examples, the transmission of the at least one signal 20 may be controlled in dependence upon the status of a passenger 28. For example, the one or more sensors 23 and the processor 12 may detect that the passenger is relaxed and may not transmit the at least one signal 20 to provide feedback to the relaxed passenger 20. Additionally or alternatively the one or more sensors 23 and the processor 12 may detect that a passenger is anxious and may transmit the at least one signal 20 to the anxious passenger to provide feedback 26 to the passenger 28 so that the passenger 28 is aware of the driving activities of the autonomous vehicle 24 and feels comforted and reassured.

In some examples the one or more sensors 23 and the processor 21 may detect one or more parameters of the status of the passenger's body to determine if the passenger 28 is relaxed or anxious. For example, heart rate, blood pressure, amount of sweating, posture and so on may be detected. In some examples, in addition or alternatively the apparatus 22 may provide such information to the processor 12 by, for example, transmitting at least one signal to the apparatus 10.

In some examples, the feedback 26 may be controlled in any suitable way in dependence upon a status of the passenger as detected by the one or more sensors 23 and the processor 12, and/or the apparatus 22 for example.

FIG. 5 illustrates an example of a method 200. The method 200 may be performed by the apparatus 50 in FIG. 3A and/or the apparatus 22 in FIG. 3B.

At block 202 reception of at least one signal from an autonomous vehicle 24 may be caused. For example, the processor 56 may cause the one or more transceivers 59 to receive a signal from the autonomous vehicle 24 illustrated in the example of FIG. 2 (see, for example, FIGS. 7 to 10).

At block 204, in response to receiving the at least one signal 20, at least one apparatus 22, separate from the autonomous vehicle 24, is caused to provide feedback 26 to at least one passenger 28 of the autonomous vehicle 24 to provide control information of the autonomous vehicle 24.

For example, the processor 56 may process the signal 20 received by the one or more transceivers 59 from the apparatus 27 and in response control the feedback circuitry 61 to provide feedback 26 to a passenger 28 of the autonomous vehicle 24.

In some examples, the processor 56 may control the feedback circuitry 61 to simulate a driving activity of the autonomous vehicle 24 by, for example, applying pressure to a part of the passenger's body.

FIG. 6 illustrates an example of a method 300. The method 300 may be performed by the apparatus 27 of FIG. 2 and the apparatus 22 of FIG. 3B.

At block 302 an autonomous vehicle 24 is controlled to perform a driving activity such as braking, accelerating, turning, indicating, changing gear and so on (see, for example, FIGS. 7 to 10).

In some examples, the autonomous vehicle 24 may be controlled by the processor 12 of the apparatus 27. In other examples, the control of the autonomous vehicle 24 may not be performed by the apparatus 27 and may be controlled by a separate apparatus.

In response to the autonomous vehicle 24 being controlled in block 302, at block 304 the autonomous vehicle 24 transmits at least one signal 20 to one or more wearable devices that are being worn by a passenger or passengers 28 of the autonomous vehicle 24. For example, the processor 12 may control the one or more transceivers 21 to transmit the at least one signal 20.

At block 306 the wearable device receives the at least one signal 20 from the autonomous vehicle 24. For example, the processor 56 may control the one or more transceivers 59 to receive the at least one signal 20.

The received at least one signal 20 is processed by the processor 56. In response to receiving the at least one signal 20 the wearable device provides feedback 26 to the passenger 28 to provide control information of the autonomous vehicle 24 to the passenger 28.

For example, the processor 56 may control the feedback circuitry 61 to simulate the driving activity of the vehicle 24 such as applying pressure to the passenger's foot to simulate the feeling experienced when braking.

In the example of FIG. 6, at block 310, the wearable device detects at least one user input from the passenger 28.

For example, the wearable device may detect a gesture performed by the passenger 28 using the motion sensors 63.

The detected input is processed by the processor 56 and at block 312 at least one signal is transmitted to change the feedback 26 provided to the passenger 28.

For example, the passenger 28 may perform a gesture such as a hand movement to turn off the feedback 26. In some examples, the passenger 28 may perform a gesture to increase or decrease the strength of the feedback or to alter the feedback in some other way. For example, the passenger 28 may perform a gesture or provide any other suitable input to change the feedback 26 to be in relation to a right-hand drive vehicle instead of a left-hand drive vehicle or vice versa.

In general, the user may provide any suitable input using the wearable device to change the feedback 26 provided.

At block 314 the autonomous vehicle 24 receives the at least one signal 64 and updates the feedback 26 to be provided to the passenger 28.

For example, the processor 12 may control the one or more transceivers 21 to receive the signal, process the received signal and update one or more control parameters stored in the memory 14.

In some examples, in addition or alternatively, the at least one user input may be detected by the autonomous vehicle 24. For example, the processor 12 may control the one or more sensors 23 to detect the user input.

In some examples blocks 310 to 314 may occur at any time before and/or after blocks 302 to 306.

In some examples one or more blocks illustrated in FIG. 6 may be omitted. For example blocks 310, 312 and 314 may be omitted. Additionally or alternatively the method 300 illustrated in FIG. 6 may comprise one or more additional actions.

FIG. 7 illustrates an example of a system 62. In the illustrated example, the system 62 comprises an apparatus 24 as illustrated in FIG. 2 and two apparatuses 50 as illustrated in FIG. 3B.

In examples, the system 62 of FIG. 7 may perform the method of FIGS. 4, 5 and/or 6.

In the example of FIG. 7 the apparatus 10 causes transmission of at least one signal 20 to a plurality of apparatuses 22 that may be wearable devices such as items of smart clothing 60.

In some examples, both of the apparatuses 22 may provide feedback 26 to a single passenger 28. For example, the upper apparatus 22 of FIG. 7 may provide feedback at a first location on the passenger's body, such as a hand or a head, and the lower apparatus 22 in FIG. 7 may provide feedback at a second, different location on the passenger's body, such as a different hand or a foot.

In other examples, the upper apparatus 22 may provide feedback 26 to a first passenger 28a and the lower apparatus 22 may provide feedback 26 to a second, different passenger 28b.

The feedback 26 provided to the first passenger 28a may be different to the feedback provided to the second, different passenger 28b.

In examples, the passenger 28 or passengers 28a, 28b may provide user input using the apparatuses 22 and one or more signals 64 may be transmitted to the autonomous vehicle 24.

In some examples, the system 62 may comprise fewer or more apparatuses 22. In general, any number of apparatuses 22 may be included in the system 62 to provide feedback 26 to one or more passengers 28.

FIG. 8 illustrates an example of a system 62.

In the example of FIG. 8 the system 62 comprises an autonomous vehicle 24 as illustrated in FIG. 2, which in the example of FIG. 8, is a ground-based vehicle 42 and is a car. The autonomous vehicle 24 has two passengers 28a and 28b travelling in it.

The system 62 of FIG. 8 also comprises six apparatuses 22 as illustrated in FIG. 3B.

In the example of FIG. 8 the apparatuses 22 are wearable devices and are smart clothing 60.

The first passenger 28a is wearing smart gloves and smart shoes and the second passenger 28b is wearing smart shoes. In the example of FIG. 8 the smart gloves and smart shoes are configured to provide tactile feedback to the passengers 28a, 28b to simulate a driving activity of the autonomous vehicle 24.

In the example of FIG. 8, the apparatuses 22 are connected to the autonomous vehicle 24 to receive signals from, and in some examples send signals to, the autonomous vehicle 24. For example, the apparatuses 22 may be connected to the autonomous vehicle using Bluetooth.

In the example of FIG. 8 no feedback 26 is being provided to the passengers 28a, 28b.

FIG. 9 illustrates a further example of a system 62.

The system 62 is as described above in relation to FIG. 8. In the example of FIG. 9 the autonomous vehicle 24 is performing a driving activity. In this example, the autonomous vehicle 24 is accelerating.

In FIG. 9, the autonomous vehicle 24 transmits at least one signal 20 to the right shoes of passengers 28a, 28b to cause the right shoes to provide feedback 26 to the passengers 28a, 28b.

In the example of FIG. 9, the shoes provide tactile feedback to the passengers 28a, 28b to give the passengers 28a, 28b a feeling similar to the feeling of pressing a gas pedal which would make a conventional car accelerate.

The feedback 26 is schematically illustrated in FIG. 9 by the lines around the right shoes of the passengers 28a, 28b.

FIG. 10 illustrates a further example of a system 62.

The system 62 illustrated in the example of FIG. 10 is the same as that described above with regard to FIGS. 8 and 9. In the example of FIG. 10 the autonomous vehicle 24 is performing a different driving activity. In the example, the autonomous vehicle 24 is changing gear.

In FIG. 10, the autonomous vehicle 24 transmits at least one signal to the shoes and right-hand glove of passenger 28a to cause feedback to be provided to the passenger 28a.

In examples the feedback 26 may be provided using the glove and/or shoe and/or other suitably located apparatus 22 corresponding to, for example, the shoe and/or glove the passenger 28a would use if driving the vehicle. In FIG. 10, the shoes and glove of passenger 28a provide tactile feedback to provide a similar feeling to passenger 28a of pressing the clutch (left shoe), gas (right shoe) and using a gear stick (right hand).

In the example of FIG. 10, as passenger 28b is not wearing smart gloves the autonomous vehicle 24 does not transmit signals to the shoes of passenger 28b to provide the gear-change feedback.

In other examples, the feedback 26 of the clutch and gas pedals may be provided to passenger 28b in the absence of smart gloves.

In examples where both passengers 28a and 28b are wearing smart shoes and smart gloves the autonomous vehicle 24 may provide gear information to the right hand of passenger 28a who is used to right-hand drive vehicles and to the left hand of passenger 28b who is used to left-hand drive vehicles. The feedback 26 may be configured and personalized by the passengers 28a, 28b using user inputs.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the present disclosure have been described in the preceding paragraphs with reference to various examples, it should be appreciated that modifications to the examples given can be made without departing from the scope of the invention as claimed.

For example when providing feedback 26 when an autonomous vehicle 24 is braking the feedback 26 may be provided in dependence on the operation of an anti-lock braking system. In some examples, the feedback 26 may comprise a sequence of haptic pulses such that the passenger 28 will feel a similar sensation as in conventional cars when the anti-lock braking system is activated. This may inform the passenger that the autonomous vehicle 24 is on a slippery surface and may, for example, prompt the passenger 28 to take control of the vehicle 24.

Similarly, in addition or alternatively the feedback may provide information on the operation of a traction control system or drive stabilization system.

Additionally or alternatively, the feedback 26 may be provided to a passenger's hand when a turn indicator is used. For example, a sequence of haptic pulses may be provided to the hand at a rate similar to the blinking of turn indicators on a conventional car. In examples, such feedback may be provided to the right hand when turning right and the left hand when turning left.

Additionally or alternatively, feedback 26 may be provided to the passenger or passengers 28 in relation to a driving indicator of the autonomous vehicle such as turning indicator's and/or hazard warning lights and so on. For example, feedback may be provided to the passenger when the autonomous vehicle 24 turns and signals the turn. In some examples, haptic feedback pulses may be provided to, for example the passenger or passenger's hands, to give a sense of inertia when the autonomous vehicle 24 is turning.

In examples any form of smart clothing may be used, for example smart trousers and/or a smart hat and/or smart eyewear and/or smart shirt and/or a smart underwear garment or garments and/or a smart scarf and/or a smart neck tie and/or a smart dress and so on. For example, an indication of turning lights may be provided to the passenger 28 in the passenger's hat or eyewear.

In examples, a mobile device, such as a mobile phone, may be used as an apparatus 22 to provide feedback 26 to a passenger 28.

In some examples, the signal(s) may be transmitted using wires and/or a combination of wires and wireless.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method, comprising:
causing transmission of at least one signal to at least one apparatus, separate from an autonomous or semi-autonomous vehicle, to cause the at least one apparatus wearable by at least one passenger of the autonomous or semi-autonomous vehicle to provide tactile feedback to the at least one passenger of the autonomous or semi-autonomous vehicle to simulate at least one driving activity of the autonomous or semi-autonomous vehicle,
wherein the at least one apparatus wearable by at least one passenger is configured for at least one of a glove or a shoe worn by the at least one passenger, and
wherein the tactile feedback causes a feeling for the at least one passenger of at least one of pressing a clutch pedal, pressing a gas pedal, or using a gear stick to simulate the at least one driving activity of the autonomous or semi-autonomous vehicle.

2. A method as claimed in claim 1, wherein the tactile feedback comprises control information to simulate the at least one driving activity of the autonomous or semi-autonomous vehicle.

3. A method as claimed in claim 2, wherein the at least one driving activity of the autonomous or semi-autonomous vehicle comprises at least one of braking, accelerating, turning, indicating, or changing gears of the autonomous or semi-autonomous vehicle.

4. A method as claimed in claim 3, wherein the tactile feedback is to simulate a response experienced by a driver of a vehicle when actuating a control of a vehicle for the at least one driving activity.

5. A method as claimed in claim 1, comprising causing transmission of at least one signal to a plurality of apparatuses to provide the tactile feedback to at least one passenger of the autonomous or semi-autonomous vehicle.

6. A method as claimed in claim 5, comprising causing transmission of at least one signal to at least a first apparatus to provide tactile feedback to a first passenger of the autonomous or semi-autonomous vehicle and causing transmission of at least one signal to at least a second apparatus to provide tactile feedback to a second, different passenger of the autonomous or semi-autonomous vehicle.

7. A method as claimed in claim 6, wherein the tactile feedback provided to the first passenger is different to the tactile feedback provided to the second, different passenger.

8. An apparatus comprising
at least one processor; and
at least one memory including computer program code;
the at least one memory and the computer program code configured to, with the at least one processor, cause the apparatus at least to perform:
causing transmission of at least one signal to at least one further apparatus, separate from an autonomous vehicle or semi-autonomous vehicle, to cause the at least one further apparatus wearable by at least one passenger of the autonomous or semi-autonomous vehicle to provide tactile feedback to at least one passenger of the autonomous or semi-autonomous vehicle to simulate at least one driving activity of the autonomous or semi-autonomous vehicle,
wherein the apparatus wearable by at least one passenger is configured for at least one of a glove or a shoe worn by the at least one passenger, and
wherein the tactile feedback causes a feeling for the at least one passenger of at least one of pressing a clutch pedal, pressing a gas pedal, or using a gear stick to simulate the at least one driving activity of the autonomous or semi-autonomous vehicle.

9. An apparatus as claimed in claim 8, wherein the tactile feedback comprises control information to simulate the at least one driving activity of the autonomous or semi-autonomous vehicle.

10. An apparatus as claimed in claim 8, wherein the at least one memory and the computer program code are configured to, with the at least one processor, cause the apparatus to perform:
causing transmission of the at least one signal in dependence upon a status of the at least one passenger of the autonomous or semi-autonomous vehicle.

11. A method comprising:
causing reception of at least one signal from an autonomous or semi-autonomous vehicle; and
in response to reception of the at least one signal causing at least one apparatus wearable by at least one passenger of the autonomous or semi-autonomous vehicle, and separate from the autonomous or semi-autonomous vehicle, to provide tactile feedback to a passenger of the autonomous or semi-autonomous vehicle to simulate at least one driving activity of the autonomous or semi-autonomous vehicle;
wherein the at least one apparatus wearable by at least one passenger is configured for at least one of a glove or a shoe worn by the at least one passenger, and
wherein the tactile feedback causes a feeling for the at least one passenger of at least one of pressing a clutch pedal, pressing a gas pedal, or using a gear stick to simulate the at least one driving activity of the autonomous or semi-autonomous vehicle.

12. A method as claimed in claim 11, wherein the tactile feedback comprises control information to simulate at least one driving activity of the autonomous or semi-autonomous vehicle.

13. A method as claimed in claim 11, further comprising:
causing detection of at least one user input from the at least one passenger; and
in response to the at least one user input causing transmission of at least one signal to change the tactile feedback provided to the at least one passenger.

14. An apparatus comprising at least one processor; and
at least one memory including computer program code;
the at least one memory and the computer program code configured to, with the at least one processor, cause the apparatus at least to perform the method of claim 11.

15. Computer program code embodied on a non-transitory computer readable medium that, when performed by at least one processor, causes the method of at least claim 11 to be performed.

* * * * *